Nov. 22, 1966  W. H. BAYNES  3,286,374
PLANETARIUM
Filed Feb. 28, 1964  2 Sheets-Sheet 2
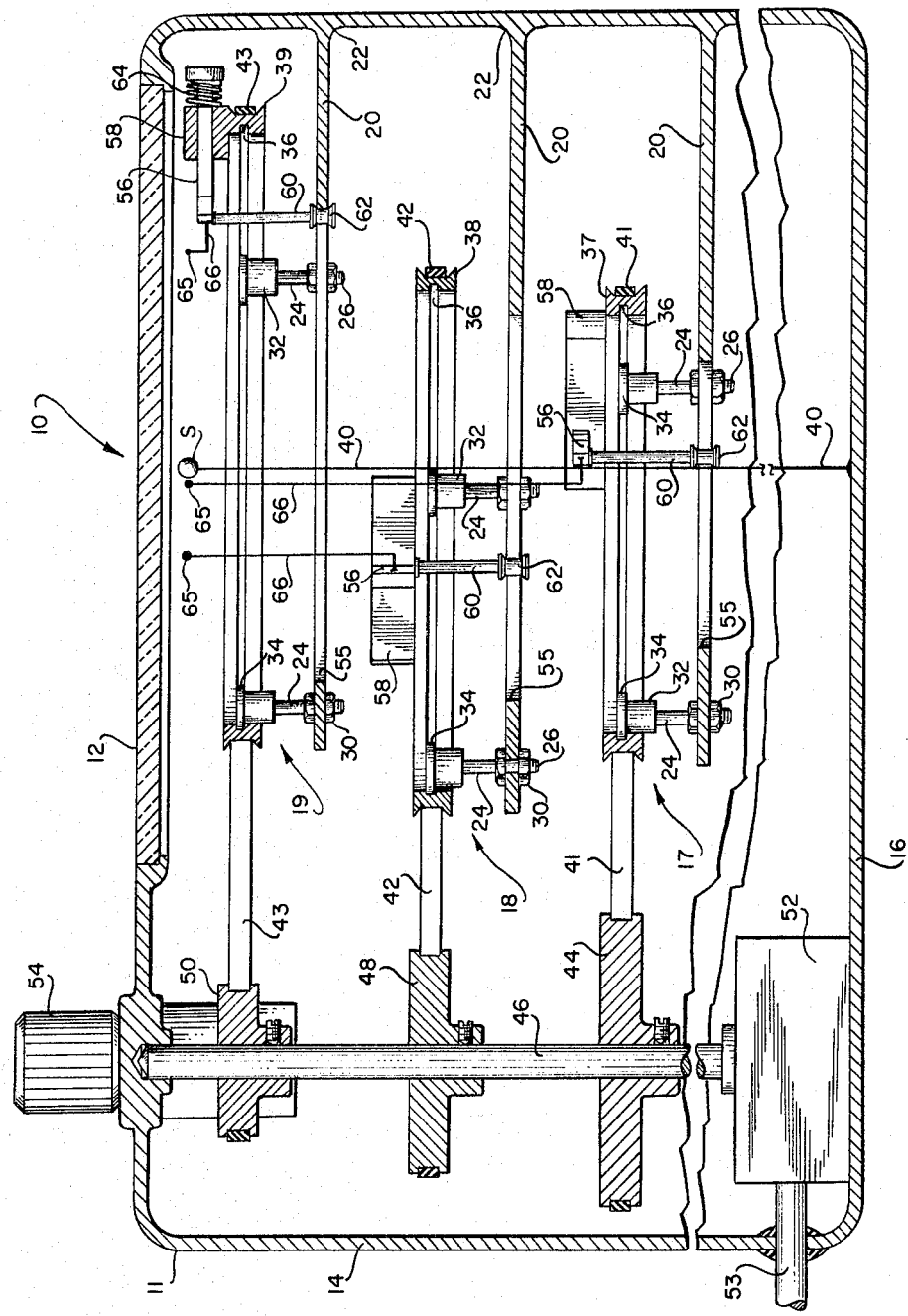
FIG_2
INVENTOR.
WILLIAM H. BAYNES
BY R.E. Geanque
Attorney United States Patent Office 3,286,374
Patented Nov. 22, 1966

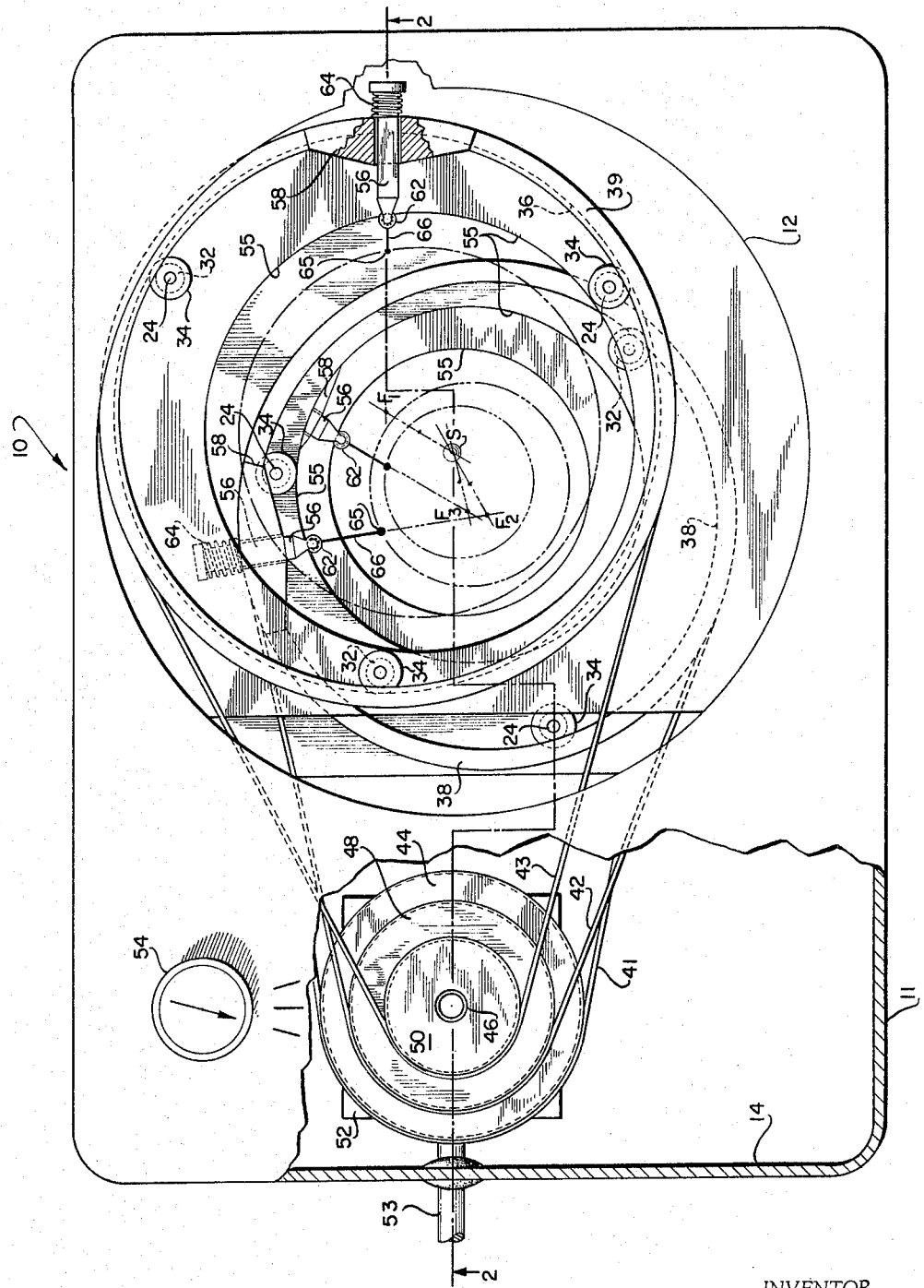

3,286,374
PLANETARIUM
William H. Baynes, 4122 Greenbush Ave.,
Sherman Oaks, Calif.
Filed Feb. 28, 1964, Ser. No. 348,077
7 Claims. (Cl. 35—45)

This invention relates to a planetarium, and more particularly to a cabinet planetarium which dynamically plots the Sun and planets of the solar system in accordance with Kepler's laws of elliptical planetary motion. The planetarium of the present invention presents in a single viewing plane the Sun and the various planets with each planetary orbit configured into an ellipse of proper eccentricity with the Sun at one focus and with proper perihelion orientation. Planetary velocity throughout each orbital period is mechanically controlled to follow the cyclic variations defined by Kepler and all orbital periods are properly related to a variable time reference.

Prior art planetariums are of two general types, projection planetariums and cabinet planetariums. The former type consists of a complex lantern projector located at the center of a large hemispherical dome. Individual spots of light are projected onto the hemispherical dome to represent the planets and other celestial bodies, and these light spots are moved in a manner corresponding to a terrestial view of the heavens. This projection type of planetarium is limited to an Earth-perspective and has the added disadvantage of high cost and large space requirements.

The prior art type of cabinet planetarium is encased in a medium sized cabinet containing a translucent viewing screen. Interior mechanisms project spots of light through this viewing screen to represent a central Sun with planets orbiting in circular paths and at constant velocities in accordance with the Copernican concept. Prior art cabinet planetariums have not evolved beyond this Copernican concept of the solar systems and have not presented the planets in elliptical orbits with cyclic velocities as defined by Kepler.

Such a prior art heliocentric cabinet planetarium combines Sun-to-planet angular position errors with Sun-to-planet radial distance errors. The angular position error is zero at aphelion and at perihelion and reaches its maximum value at about the quarter-orbit point and the three quarter-orbit point. The radial distance error varies in the same cyclic frequency but is about ninety degrees out of phase with the angular position error. As a result, this prior art heliocentric presentation never exhibits a planetary plotted position free of both angular position errors and radial distance errors.

The planetarium of the present invention, on the other hand, plots the planets in a single viewing plane in accordance with the astronomical reality of elliptical orbits with the Sun at one focus of each orbit. Each planetary orbit is an exact replica to scale of its solar system counterpart with identical eccentricity and with proper perihelion orientation. Sun-to-planet radial distance errors are reduced to zero by this new plotting technique.

Kepler's law of planetary motion states the fact that the elliptical sector measured at the Sun covers equal areas in equal times regardless of whether the planet is near or far from the Sun. Planetary velocity therefore follows a cycle with its lowest value at aphelion and with its highest value at perihelion. The Sun-to-planet angular position plotting errors inherent to a circular orbit constant velocity presentation constitute the most critical deficiency of prior art heliocentric cabinet planetariums, with maximum angular plotting error for each planet being approximately expressed by the following empirical formula: "Maximum angular position error in degrees equals 115 times orbital eccentricity." A table to be hereinafter set forth, includes a listing of maximum angular plotting errors associated with prior art heliocentric cabinet planetariums.

However, in the planetarium of the present invention, the maximum angular plotting errors of the plotted planets are reduced by about two orders of magnitude from those associated with prior art presentations by the application of a novel mathematical and geometric discovery stated as follows: "A planet moving according to Kepler's equal-areas law, when observed from the alternate focus to the Sun, travels at an almost constant angular velocity." By the technique to be described, each planet is positioned on its orbit by orbital time applied as a constant velocity rotational input to a point corresponding to the alternate focus. The very small maximum Sun-to-planet angular position errors resulting from this novel plotting technique increase in an exponential manner with increasing eccentricity. However, the maximum angular plotting error of this method is less than one degree in the extreme case of Pluto and reduces to insignificant values for the other planets. The approximate maximum angular position plotting errors resulting from this plotting method are listed for comparative purposes in the following table.

| Planet | Eccentricity | Approximate Maximum Angular Plotting Error | |
|---|---|---|---|
| | | Prior Art Heliocentric Planetarium, deg. | Planetarium of the Present Invention, deg. |
| Mercury | .2056 | 23.64 | 0.66 |
| Venus | .0068 | 0.78 | <0.001 |
| Earth | .0167 | 1.92 | 0.004 |
| Mars | .0934 | 10.74 | 0.14 |
| Jupiter | .0484 | 5.57 | 0.036 |
| Saturn | .0557 | 6.41 | 0.045 |
| Uranus | .0470 | 5.41 | 0.033 |
| Neptune | .0087 | 1.00 | 0.001 |
| Pluto | .2470 | 28.41 | 0.98 |

Accordingly, it is the primary object of the present invention to provide a cabinet planetarium not subject to the disadvantages and inherent inaccuracies of prior art cabinet planetariums and which dynamically plots and presents an accurate and realistic scale model of the solar system.

Another object of the present invention is to provide an improved cabinet planetarium of the type which exhibits all planetary orbits in a single viewing plane.

Yet another object of the present invention is to provide a panetarium which plots the planets of the solar system in elliptical orbits of proper eccentricity and with proper perihelion orientation.

Another object of the present invention is to provide a planetarium which presents the orbital velocity of each planet as a controlled variable quantity throughout each orbital cycle in accordance with Kepler's equal-areas law.

A further object of the present invention is to provide a planetarium of the type described having an element representing the Sun as a common focus for all planetary elliptical orbits and having the centers of rotation of circular driving members which drive the planets in their elliptical orbits located respectively at the alternate foci of said elliptical orbits.

A still further object of the present invention is to provide a planetarium of the type described which plots the orbits of the planets by employing for each orbit the focus alternate to the Sun as the plotting reference.

According to the present invention, a plotting reference in the form of a hoop is suspended on a set of small rollers in a cabinet. The hoop is centered at the alternate focus from the Sun of the orbit to be plotted and is driven by a belt at a constant velocity inversely proportional to the orbital period. The rollers supporting the hoop are mounted on a flat plate which is firmly attached to the cabinet structure. A radial slide on the hoop carries a small roller plus a small light source representing the planet.

The flat plate on which the hoop is mounted has its central area cut out and shaped into a smooth, curved, cam surface which corresponds to the orbit of the planet to be plotted. The roller on the radial slide rides against the curve and is held there by spring tension. The curved surface is so configured in size and shape that the planetary point traverses a precise elliptical orbit, with eccentricity the same as the real orbit of the plotted planet, around the Sun as the hoop rotates through a revolution about the alternate focus. The curved cam surface is also oriented to give the proper angular orientation of the perihelion of the plotted orbit with respect to the Sun.

A separate plate and hoop combination is used for each planet to be plotted. These plate and hoop combinations are placed one behind the other in the cabinet. The most remote planet, Pluto, is plotted by the forward plate. The second plate is used for the next most distant planet, Neptune. The other planets are arranged on plates in descending order with Mercury being plotted by the ninth plate. However, for purposes of illustration, but not of limitation, only three plates are shown herein. The area cut out of the forward plate to form the curved cam surface permits an unobstructed view of all lesser orbits. A mechanical projection of each planetary plotted point is made to a single viewing plane by attaching small extension members to each planetary light source perpendicular to the plotting cam surface.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a plan view of the planetarium of the present invention with portions of the cabinet structure thereof broken away to show internal construction; and FIGURE 2 is a vertical, cross-sectional view taken along line 2—2 of FIGURE 1.

Referring again to the drawings, the planetarium constituting a presently preferred embodiment of the invention, generally designated 10, includes a cabinet 11 having a translucent screen 12, an encompassing side wall 14 and a bottom wall 16. The screen 12 is made of translucent material so that the mechanism, to be hereinafter described, housed in the cabinet 11 may not be seen through the screen but a small light representing the Sun or the planets to be plotted may be viewed therethrough. The side wall 14 and the bottom wall 16 may be made of any suitable material, such as metal.

Three plotting mechanisms 17, 18, and 19 are mounted in the cabinet 11 and each includes a flat plate 20 which may be secured to the side 14 by weldments 22 (FIGURE 2). A plurality of bolts 24 are mounted on each plate 20 and include threaded ends 26 which pass through the plates 20. A nut 30 is employed to secure each bolt 24 to its respective plate. A roller 32 is rotatably mounted on each bolt 24 at its end remote from the threaded end 26. The rollers 32 include annular flanges 34 which engage annular grooves 36 provided on plotting-reference hoops 37, 38, and 39. Since a planet moving according to Kepler's laws, when observed from the alternate focus of its elliptical orbit, travels at an almost constant angular velocity, the hoops 37, 38, and 39 are mounted for rotation upon the rollers 32 about centers of rotation $F_1$, $F_2$, and $F_3$, respectively, corresponding to the alternate foci of the elliptical orbits of the planets to be plotted (FIGURE 1). The other focus of each elliptical orbit is identified by a light source or bulbs which represents the Sun, which is common to all orbits and which is fixed in space by a rod 40 connecting it to the bottom wall 16. The hoops 37, 38, and 39 are driven by belts 41, 42, and 43, respectively, at a constant velocity inversely proportional to the orbital period of the planet being plotted by a respective hoop. The belt 41 is trained about a pulley 44 which has a first diameter and is rigidly affixed to a driven shaft 46. The belt 42 is trained about a pulley 48 which has a second diameter and is also rigidly affixed to the shaft 46 and the belt 43 is trained about a pulley 50 which has a third diameter and is likewise rigidly affixed to the shaft 46. The shaft 46 constitutes the output shaft of an electrically driven gear box 52 which drives the shaft 46 to rotate the pulleys 44, 48, and 50. Power is supplied to the gear box 52 through an electric cable 53 and the angular velocity of shaft 46 is controlled by controller 54.

Each plate 20 has its central area cut out to form a cam surface 55. Each cam surface 55 conforms in shape to the elliptical orbit to be plotted by its associated plotting mechanism 17, 18, or 19. The hoops 37, 38, and 39 each carry a radial slide 56 which is slidably mounted on a plate 58 connected to its associated hoop and which includes a depending arm 60 on which a cam roller 62 is rotatably mounted. The rollers 62 engage an associated cam surface 55 so that the position of the radial slides 56 may be controlled by the cam surfaces 55. The rollers 62 are maintained in engagement with their cam surfaces 55 by suitable springs, like the one shown at 64 in FIGURE 2. An electric light bulb 65 representing a planet to be plotted is connected to each slide 56 by an arm 66 and, when illuminated, displays the orbital path defined by its associated cam surface 55 under the translucent screen 12.

Of course, it is apparent that the several cam surfaces 55 may be designed to represent the orbits of a number of different planets. For example, the most remote planet, Pluto, may be plotted by the forward plotting mechanism 19. The intermediate mechanism 18 may be used for the next most distant planet, Neptune, with another closer planet being plotted by the rear mechanism 17. The bulbs 65 are positioned adjacent the screen 12 so that their orbits will be traced in the same viewing plane as the Sun S.

While the particular planetarium herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. A device for plotting elliptical planetary orbits having the Sun for one focus and an alternate focus, comprising:
    a plate member having a cam surface corresponding to the orbit of a planet to be plotted;
    a circular hoop member rotatably mounted on said plate member, said hoop member being centered about a point corresponding to said alternate focus; and
    cam means connected to said hoop member in engagement with said cam surface.

2. A device for plotting elliptical planetary orbits comprising:
    a fixed reference means representing the Sun, said reference means being located at a point corresponding to one focus of an elliptical planetary orbit;
    hoop means centered rotatably about a point corresponding to the alternate focus of said orbit;
    cam means connected to said hoop means for rotation therewith about said reference means, said cam means representing a planet to be plotted;
    cam surface means engaging said cam means to guide said cam means in a predetermined path about said reference means, said cam surface means being shaped to correspond to the orbital path of a planet to be plotted by said device; and drive means connected to said hoop means for rotating it at a predetermined angular velocity.

3. The device of claim 2 wherein said reference means is located in a predetermined plane and said cam means rotates about said reference means in said predetermined plane, whereby said reference means and said cam means are viewable in a single viewing plane.

4. The device of claim 3 wherein said reference means comprises a first electric light bulb.

5. The device of claim 4 wherein said cam means includes a second electric light bulb representing said planet to be plotted.

6. The device of claim 5 including a translucent screen superjacent said light bulbs.

7. A device for plotting elliptical planetary orbits, comprising:

a cabinet;

a translucent viewing screen mounted in said cabinet;

a fixed light source mounted in said cabinet subjacent said screen, said fixed light source representing the Sun and being located at a point corresponding to the common foci of a plurality of elliptical planetary orbits;

a hoop means rotatably mounted in said cabinet for centered rotation about a point corresponding to the alternate focus of each of said orbits;

a cam connected to each hoop means for rotation therewith;

a cam surface engaging each cam to guide said cams in predetermined paths corresponding to said orbits;

a moveable light source connected to each of said cams for rotation therewith, said moveable light sources being positioned in the plane of said fixed light source; and drive means connected to each hoop means for rotating it at a predetermined angular velocity.

References Cited by the Examiner

UNITED STATES PATENTS

| | | | |
|---|---|---|---|
| 571,785 | 11/1896 | Mowery | 35—45 |
| 3,035,356 | 5/1962 | Musser | 35—45 |

OTHER REFERENCES

Cundy et al.: "Mathematical Models," published by Oxford University Press. Received by Science Library October 29, 1958. Copy in class 35. Library pages 28 and 30 only relied on, QA11C8, 1957.

EUGENE R. CAPOZIO, *Primary Examiner.*

H. S. SKOGQUIST, *Assistant Examiner.*